Inventors
ALEC H. REEVES
PAUL BARTON
By Alfred C. Hill
Agent

United States Patent Office 3,553,678
Patented Jan. 5, 1971

3,553,678
CODER
Alec Harley Reeves and Paul Barton, Harlow, England, assignors to International Standard Electric Corporation, New York, N.Y., a corporation of Delaware
Filed Apr. 10, 1967, Ser. No. 629,765
Claims priority, application Great Britain, Apr. 18, 1966, 16,816/66
Int. Cl. H03k 13/02
U.S. Cl. 340—347     10 Claims

ABSTRACT OF THE DISCLOSURE

Differently weighted coding elements produce an output signal after each coding operation proportional to the sum of their weighted output signals which is subtracted from the analog input signal to provide a difference signal for application to the coding elements. After each coding operation the difference signal is sampled and logic circuitry is activated by the binary condition of the coding elements to produce, from each sample, threshold and weight feedback signals for application to each of the coding elements to stabilize their weight and threshold values.

---

This invention relates to analog-to-digital coders such as coding equipment for P.C.M. (pulse code modulation) systems.

In any coder it is desirable that close tolerances will be maintained throughout the life of the equipment, since loss of tolerances to even a small degree will introduce errors into the digital output. Normally the coding of an analog quantity, which can have any value between certain limits, involves the selection of one of a number of discrete quantum steps, or "levels" as they are hereinafter termed. Each level is obtained by providing a number of coding elements, equal in number to the number of digits in the code. Each coding element has a predetermined quantum value or "weight." A level is made up of one or more weights in combination, like adding scales to a balance pan. The signal level required to add or subtract any given weight is the "threshold" for that weight.

It is seldom that an analog value will be exactly equal to one of the levels, with the exception perhaps of level 0 which usually represents zero analog signal. In most cases there will be a difference between the actual analog input value and the value expressed as a digital output. Moreover, in multi-digit coders in which the analog input is applied to several coding elements in stages which vary each from the next by a quantum jump, there will be a successively different "difference signals" between the analog input and each stage. Since this difference signal is usually the effective analog input to the next stage it will be seen that any loss of tolerance leading to inaccuracies in the difference signal at any stage will cause errors in the outputs of the subsequent stages.

The problem posed in detecting and remedying loss of tolerances in analog-to-digital coders is made more difficult, in the case of P.C.M. encoders, for example, by the fact that such equipment may operate at very high speeds. For example, converters are now being constructed whose digital output rate is measured in terms of 100 megabits/sec. or faster.

According to the invention there is provided an analog-to-digital coder including means for sampling the input to the coding elements at the termination of each coding operation, means for storing separately the samples so obtained for each code output, means for generating a feedback signal for each code output, the value of the feedback signal being related to the stored samples and means for applying the feedback signals to the coding elements.

However, in any practical P.C.M. coder it is inconceivable that thresholds and weights will vary at the bit rate. Such changes will be caused by aging and temperature and humidity variations whose time constants are of the order of seconds or more. It is, therefore, unnecessary to use feedback loops operating at the bit rate to correct threshold and weight errors.

According to one embodiment of the invention the coder includes means for integrating the stored samples for each code output and means for generating a feedback signal for each code output, the value of the feedback signal being related to the value of the integrated samples.

The above and other features of the invention will be more readily understood from the following description of embodiments thereof with reference to the drawings, in which:

FIG. 1 is a schematic block diagram of a 3-digit coder incorporating feedback for stabilizing weight and threshold tolerances, FIG. 2 illustrates the difference signal waveform in an ideal coder, FIGS. 3A–F illustrate the effect of weight and threshold errors on the difference signal in a coder, FIG. 4 is a block schematic diagram of the sample logic for one digit position of the coder shown in FIG. 1, FIG. 5 illustrates the difference signals in an ideal coder with reference to level 4.

Figure 1:
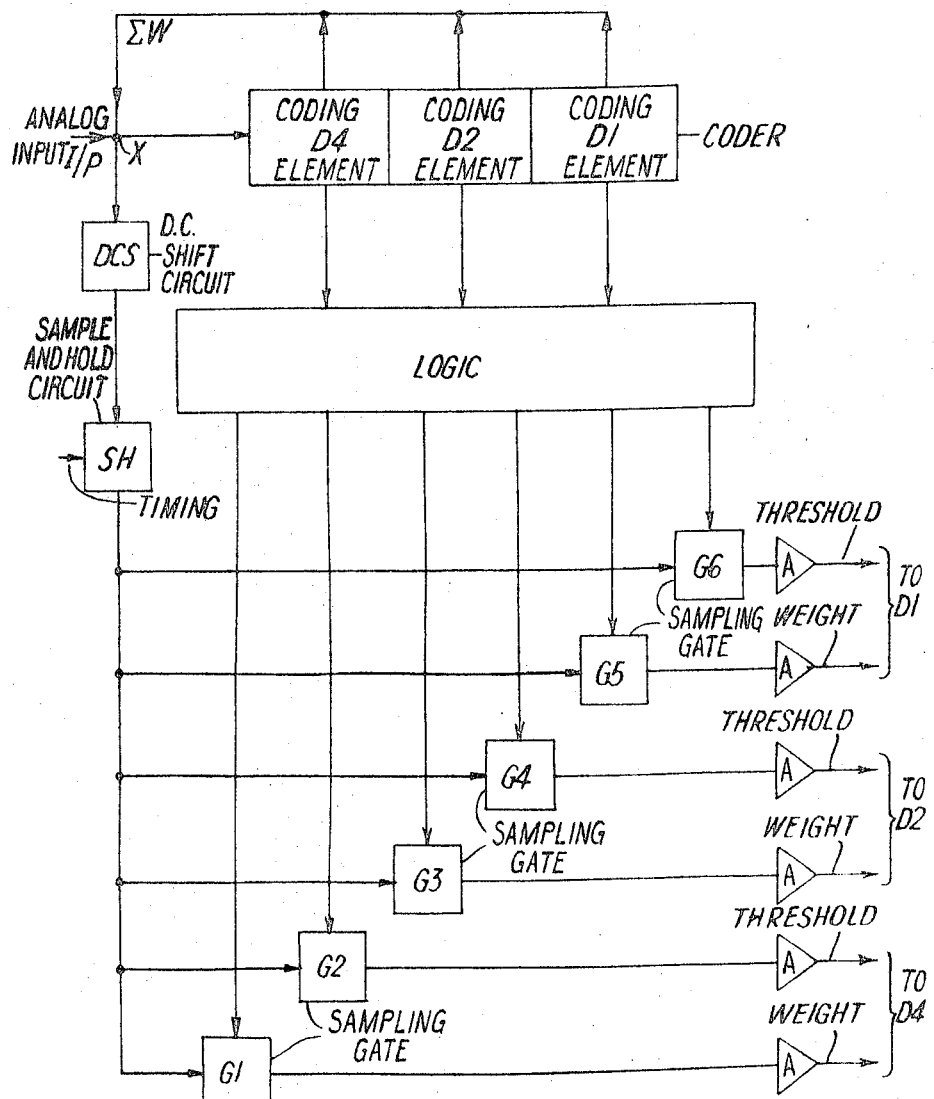

The coder shown in FIG. 1 is a three digit coder in which an analog signal input I/P is applied to three coding elements D4, D2 and D1. These represent respectively weights of 4, 2 and 1 and each has binary outputs either "0" and "1" depending on whether that weight is included in the coded output. The weights supplied by the coding elements are subtracted from the analog input by means of the feedback path ΣW. The coding elements may be connected in any convenient arrangement. Hitherto the main coding arrangements have been defined as series or parallel. Recently a new coding concept called the equilibrium coder has been proposed in U.S. patent specification No. 3,320,605 in which the analog input is applied to the coding elements in parallel together with a damped oscillation and the coding elements are allowed to settle sequentially. This invention is applicable to all these types of coder.

The operation of the coder shown in FIG. 1 will be described in more detail in terms of basic coding principles for the sake of explaining the invention.

Figure 2:
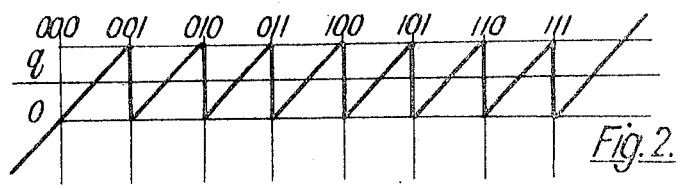

Consider the application of a slowly rising analog value to the input of an ideal coder, as shown in FIG. 2. The analog value starts at zero and the coder digital output is 000. As the analog value rises it reaches a quantum level of 1. When this is reached, it being a threshold value for the smallest coding element, the latter is switched on, and the code output is now 001. At this instant, the weight applied by the switching on the smallest element is subtracted from the input. This weight has a value 1 and, in an ideal coder will reduce the applied input to zero, since the latter has only reached a value equal to weight 1. The resulting sawtooth waveform of FIG. 2 represents the difference signal such as will appear at point X in FIG. 1. This difference signal has minimum of zero and a maximum of $q$, where $q$ is equivalent to the quantum step between coded levels.

Let the input continue to rise now, above level 1. The difference signal begins to rise again until it reaches the value $q$. At this point the threshold of the second coding element, having a weight of 2, is reached and it is switched on. Immediately a weight of 2 is subtracted from the input but, as the latter already has a weight of 1 taken from it, it has in theory a difference signal of value −1. However, the subtraction of the weight 2 reduces the input below the threshold of the smallest coding element which is, therefore, switched off. So now the only weight switched on is 2, the difference signal is once more zero and the code output is now 010. The process is continued with the difference signal rising each time until the threshold level $q$ is reached whereupon coding elements are switched on and off as required to reduce the difference signal to zero.

It has been stated above that FIG. 2 is obtained in an ideal coder. In practice a number of errors may be introduced into the system which will distort the perfect sawtooth of FIG. 2.

Consider for a moment a transistorized bistable coding element. A typical coding element is a pair of transistors having a common constant-current emitter supply. The base currents are so arranged that when one of the transistors is on the other is off and vice versa. The constant-current supply is the weight, which is switched on or off by the coding element, and the relative base current values define the threshold at which the element will switch the constant-current supply from one transistor to the other. It is easy to see how substandard components or components whose characteristics change over a period of time can introduce errors into the weight and thresholds of the coding element. Two typical types of error will be discussed in detail, namely, low threshold and low weight.

Figure 3A:
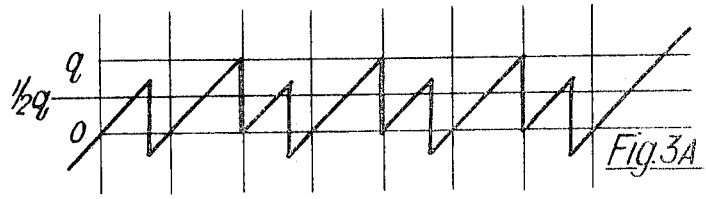

FIG. 3A shows the effect on the difference signal of a low threshold value for the smallest coding element D1. Starting from zero the difference signal will rise, but will not reach the value $q$ before the coding element D1 switches on. Not only will D1 switch on with too small an input signal, it will also switch on too soon. When the weight 1 is then subtracted from the input, the difference signal will theoretically fall below zero, since the weight subtracted is greater than the input. Subsequently the difference signal will rise and, assuming D2 to have correct weight and threshold values, it will switch on and D1 will switch off at the correct moment. However, the next switching operation again involves D1 and so once more the difference signal will fail to reach the level $q$ and be reduced to a negative value when D1 switches on too soon. It will be seen that for all the code outputs 001, 011, 101 and 111 the difference signal fails to reach the level $q$ and is prematurely reduced to below zero.

Figure 3B:
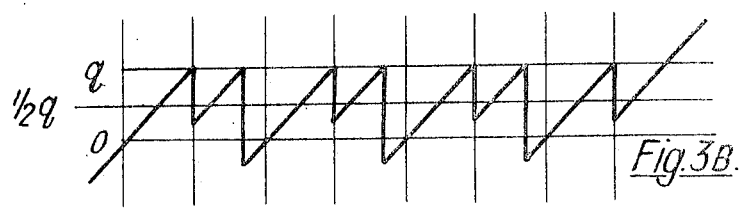

FIG. 3B shows the effect of a low weight supplied by D1. In this case D1 will switch at the correct time, but will not reduce the difference signal to zero, since the weight subtracted is less than 1. When D2 switches on and D1 switches off the full weight of 2 is subtracted by D2, but D1 can only restore its low weight of less than 1. The sum total of the additions and subtractions leaves the difference signal below zero. Thus, the difference signal will fail to reach zero at code outputs 001, 011, 101 and 111 and will prematurely drop to below zero at code outputs 010, 100 and 110.

Figure 3C:
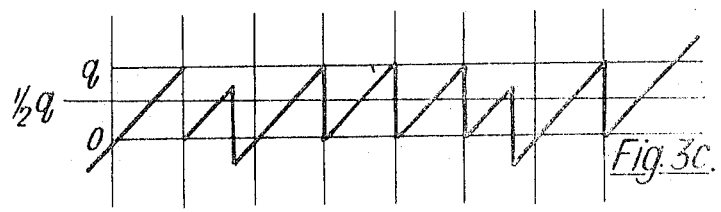

It will be noted that there is a distinct pattern appearing in each of FIGS. 3A and 3B and that these patterns each conform to a rule. It can be shown in FIGS. 3C and 3E that different distinctive patterns appear in the case of low thresholds in D2 and D4, but that these patterns conform to the same rule as that in FIG. 3A.

Figure 3D:
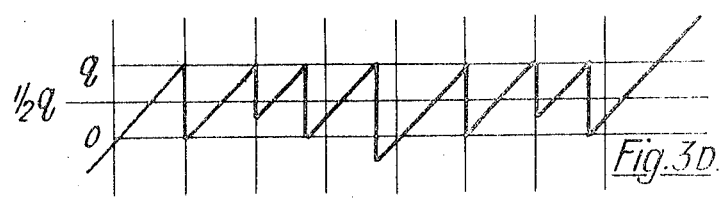
Figure 3E:
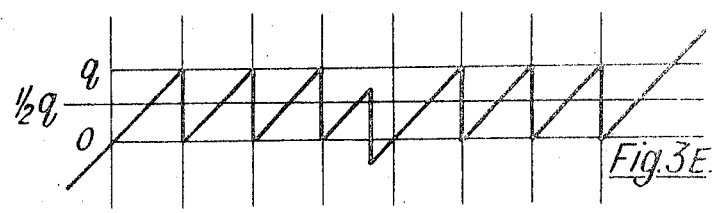
Figure 3F:
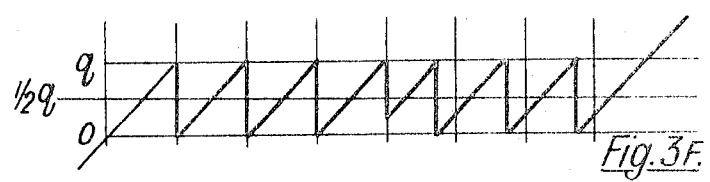

Similarly low weights in D2 and D4 produce distinctive patterns in FIGS. 3D and 3F conforming to the same rule as that in FIG. 3B.

It is on the possibility of recognizing these patterns and so being able to identify the particular fault and its location that the present invention is based. It will be observed that each of the patterns in FIGS. 3A–3F is unique and corresponds to a unique combination or combinations of digital codes. Therefore, by utilizing logic responsive to different code outputs and sampling the difference signal it is possible to detect particular patterns therein. FIG. 1 shows an arrangement in which logic responsive to the digital conditions of the coding elements is made to control sampling gates G1–G6 to extract information from the difference signal about the weight and threshold values for each coding element.

Figure 4:
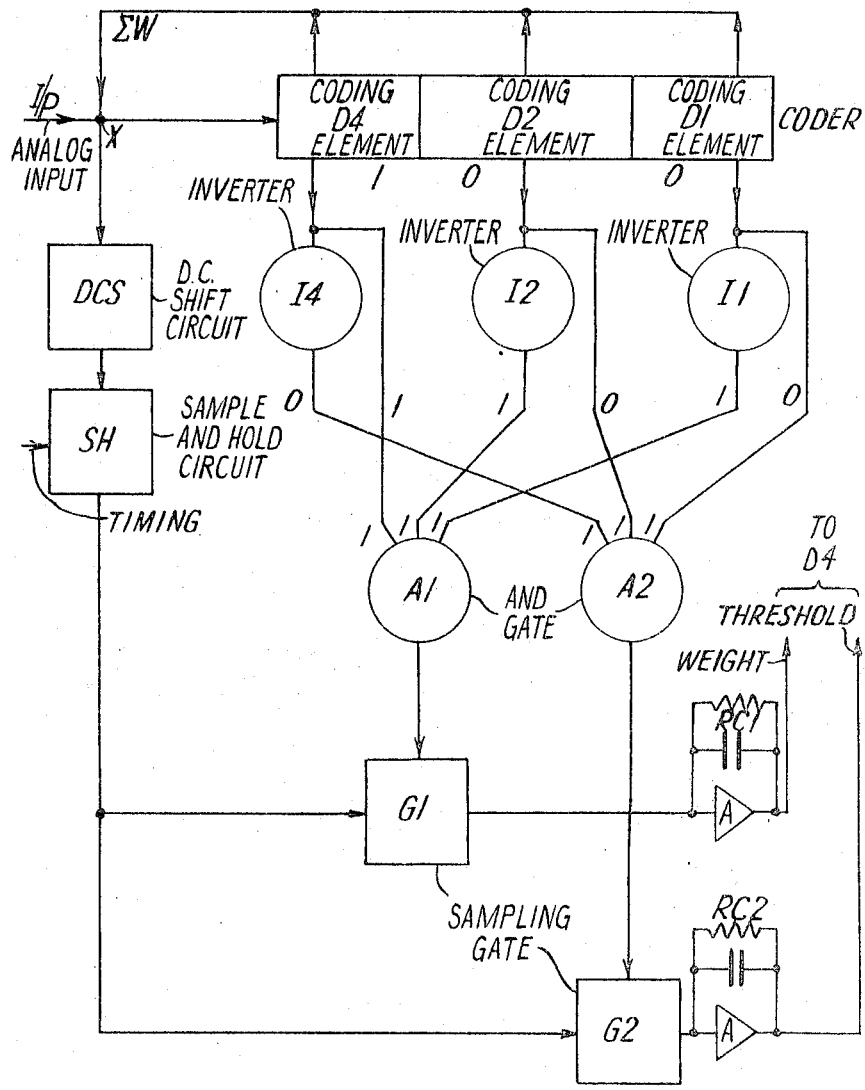

The logic for one such coding element is shown in FIG. 4 and consists of two sampling gates G1 to sample the difference signal to detect weight errors and G2 to sample the signal for threshold errors, each opened when a particular digital pattern is present. Since the pattern of the controlling logic depends on the coding element concerned and the type of error. FIG. 4 will be described with particular reference to the element D4. Before going into the detailed operation of FIG. 4 further explanation is necessary on the recognition of certain types of error.

It will be appreciated that after the great majority of coding operations there will be a difference signal. The only occasions in which no difference signal will appear is when the analog value equals one of the quantum levels. It will also be appreciated that over a long period of time, compared to the bit rate, the distribution of the samples of the difference signal amplitude will be fairly even between the limits of zero and $q$ when there are no errors in thresholds and weights. The long term average of the difference signals will therefore be $\frac{1}{2}q$ and this level has been indicated in FIGS. 3A–3F.

Now, even if an error in threshold or weight does occur, the distribution of difference signals after any particular coding operation will still be evenly spread throughout the available range, which will not now be zero–$q$, but some other range. Take for example a low threshold in D1. The distribution of difference signals after D1 has switched on will be even over a range starting below zero and rising to $q$. The long term average of these signals will, therefore, be below $\frac{1}{2}q$. On the other hand, for a low weight in D1 the even distribution of difference signals over the available range immediately after D1 has switched on will result in an average difference signal level higher than $\frac{1}{2}q$.

It is only necessary to sample the difference signal at a time appropriate to each coding element and integrate these samples to obtain an average figure to obtain information relating to possible error in the coding element and so introduce the necessary stabilizing feedback.

The requirement of the logic is that to detect errors in the weight of D4 it shall respond at the end of a coding operation when D4, and only D4 is switched on, as will be explained later. Therefore, an output is taken from each coding element and applied to corresponding inverters I4, I2 and I1. Two outputs can now be derived from each coding element, the proper 0 or 1 as the case may be and the inverted output $\bar{0}$ or $\bar{1}$, which are more simply regarded as 1 or 0, respectively. Two AND gates A1 and A2 are connected to respond to distinctive patterns, gate A1 responding to the combination 111 derived from the normal output of D4 and the inverted outputs of D2 and D1, and gate A2 responding to the combination 111 derived from the inverted output of D4 and the normal outputs of D2 and D1. When the gates A1 and A2 respond to the appearance of the patterns as described they open their respective sampling gates G1 and G2. The function of gates A2 and G2 will be described later.

Figure 5:
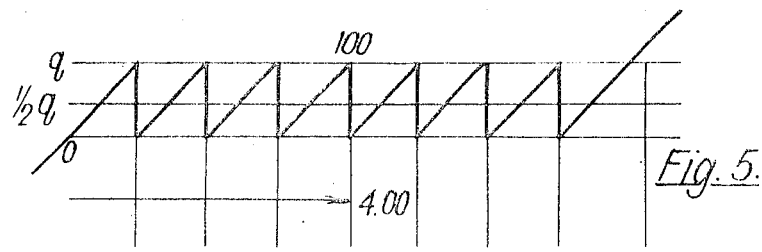

Consider for a moment the sequence of events when an analog input exceeding level 4 is received. It will be assumed that coding elements D2 and D1 are error free. After a certain time element D4 will be switched on. If a short time after this the difference signal is sampled, it is possible to detect any deviation from the normal difference signal. If D4 is error free the sampled signal will be zero, compared with the average difference signal level, as shown in FIG. 5. If, however, the coding element D4 has an increased threshold level then the sampled signal will be above zero by an amount proportional to the increase in threshold level as shown in FIG. 6.

To simplify matters in the case of a high speed coder, it is desirable to insert a sample and hold circuit SH in front of the sample gates G1, G2. This is to allow the logic time to operate relatively slowly compared with the bit rate of the coder.

Figure 6:
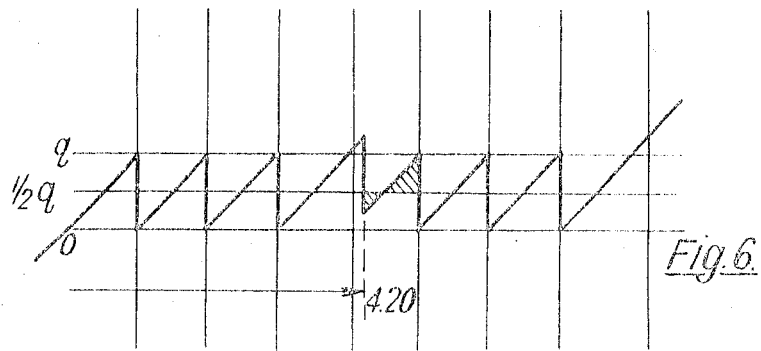
FIGS. 6 and 7 illustrate the difference signals in a coder having an error in threshold at level 4.

It will be seen from an examination of FIG. 6 that in the case of a high threshold at D4 that the deviation from the normal in the difference signal must always be a late switching of D4 coupled with a shorter rise time to the next switching operation. For a low threshold the converse will be true, as reference to FIG. 3E will show. One way of detecting this deviation will now be described. Before the difference signal is sampled it is subjected to a D.C. shift in the circuit DCS so that its reference level is now effectively $\frac{1}{2}q$ instead of zero. The $\frac{1}{2}q$ level has been shown in all FIGS. 3A to 3F and FIGS. 5, 6 and 7. It is assumed that in the case of an error free coding element the average difference signal after coding will be zero with reference to the $\frac{1}{2}q$ level. Since the difference signals are subjected to a D.C. shift so that $\frac{1}{2}q$ equals zero then the average of the difference signals will be zero. This assumes no errors in the coding element threshold or weight.

If now the threshold starts to rise, it will be seen from FIG. 6 that the shaded area below the $\frac{1}{2}q$ line becomes smaller than that above the line. Given that there will still be an even distribution of samples throughout the available range of the difference signal, the average of the samples will now be more than zero.

Figure 7:
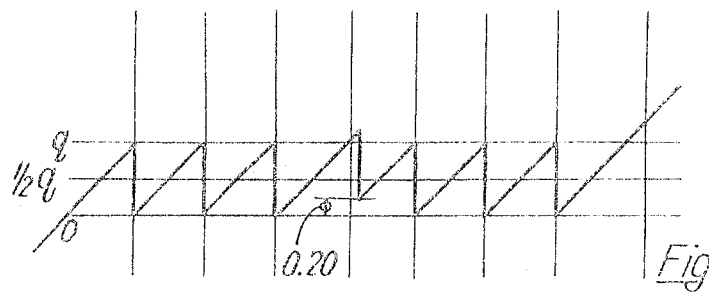

Alternatively, the deviation in the difference signal can be considered from the point of view of the minimum difference signal for a particular coded output. This will be zero for all codes in the ideal case. However, an error such as a high threshold in D4 will cause the minimum difference to change by an amount equal to the change in threshold, as indicated in FIG. 7.

It has been stated above that to detect an error in weight in D4 the difference signal must be sampled at the end of a coding operation when D4 and only D4 is switched on. The logic in FIG. 4 is, therefore, arranged so that gate A1 opens when D4 is in the 1 condition, but D2 and D1 still remain in the 0 condition. The sample obtained by the opening of G1 in response to the operation of A1 is fed to a network RC1 having a time constant large compared to the bit rate, for example, 20 secs. This is long enough to ensure that in the absence of errors the average difference signal level will be $\frac{1}{2}q$. If the level changes, then an error is present and feedback is applied. The feedback circuit arrangements form no part of the present invention. One way in which the feedback can be controlled is to make the network RC1 a feedback network for an amplifier which in turn generates a feedback current to be used in a way described later.

To measure the threshold error in D4, it is convenient to sample the difference signal at a different time to that at which the weight sample is taken. Reference to FIG. 3F shows that whereas a weight error affects the timing of the next coding element a threshold error affects the timing of the element in question, as shown in FIG. 3E. Therefore, it is convenient to sample the difference signal before D4 switches. The logic in FIG. 4 is connected so that A2 responds when D4 is in the 0 condition and D2 and D1 are in the 1 condition at the end of a coding operation. The rest of the circuit is the same as for the weight sample except that it is desirable to provide the network RC2 with a different time constant to that of RC1, say 10 seconds. This ensures that one of the stabilizing feedback loops finishes its corrective action before the other starts and so reduces the risk of interaction between the two which could lead to instability.

Figure 8:
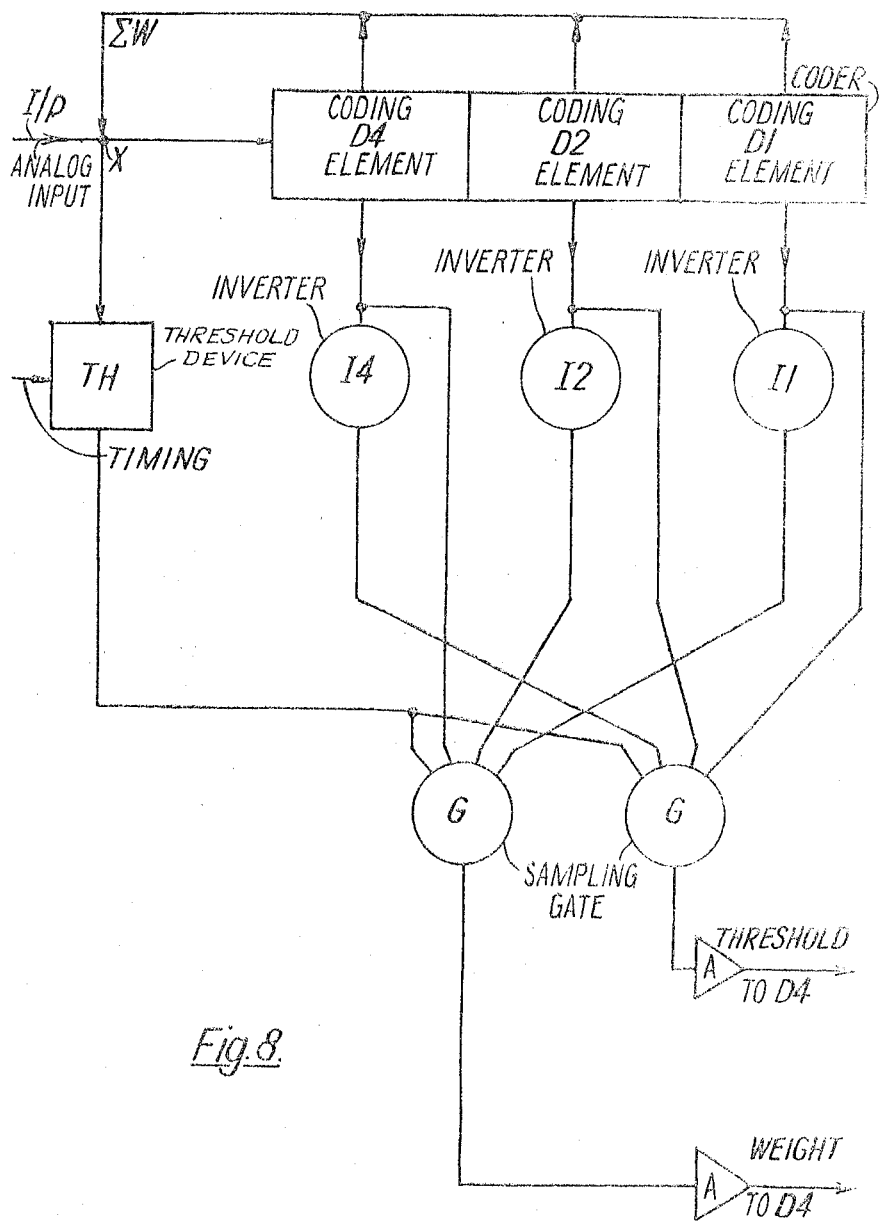
FIG. 8 is a block schematic diagram of an alternative logic arrangement to that of FIG. 4, and FIGS. 9A, 9B, and 10 illustrate two methods of applying stabilizing feedback to a coding element.

As an alternative to sampling the actual difference signal, the error information can be derived in a pure digital arrangement as shown in FIG. 8. The difference signal is applied to threshold devices TH which detect difference signal peaks above the $q$ and below zero. These peaks are used as additional inputs to the timing logic, which is the same as in FIG. 4, and the error information is obtained in the form of pulse trains. Again it is desirable to introduce networks (not shown) having long time constants so that only the long term changes in threshold and weights take effect.

The application of the two feedback signals to the coding elements can take various forms. One form of feedback will be described for tunnel diode coding elements as shown in FIGS. 9A and 10.

Figure 9A:
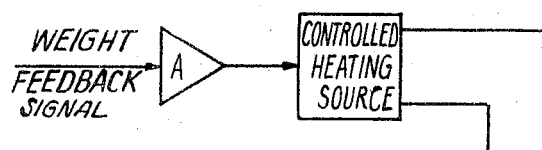
Figure 10:
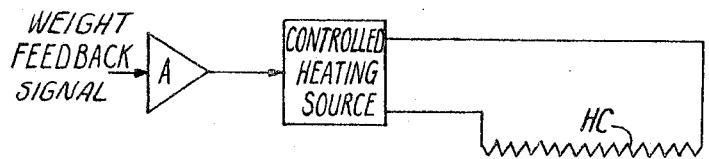
Figure 10:
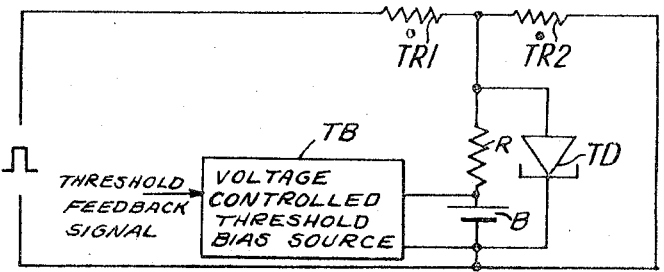

According to FIG. 9A, the threshold of tunnel diode TD is adjusted by the threshold feedback voltage by controlling the switching bias voltage, threshold value, of diode TD through means of a voltage controlled threshold bias source TB.

Weighting depends on a constant current flowing through a constant resistance. With a two terminal device, such as a tunnel diode TD, it is impracticable to change the switching currents, so a means is needed of varying the resistance in the circuit. The method proposed uses an indirectly heated thermistor TR as the weighting resistance as shown in FIG. 9A. By changing the power in the heating coil HC, a change of resistance can be effected. This simple arrangement has the disadvantage that the threshold changes as well as the weight.

Figure 9B:
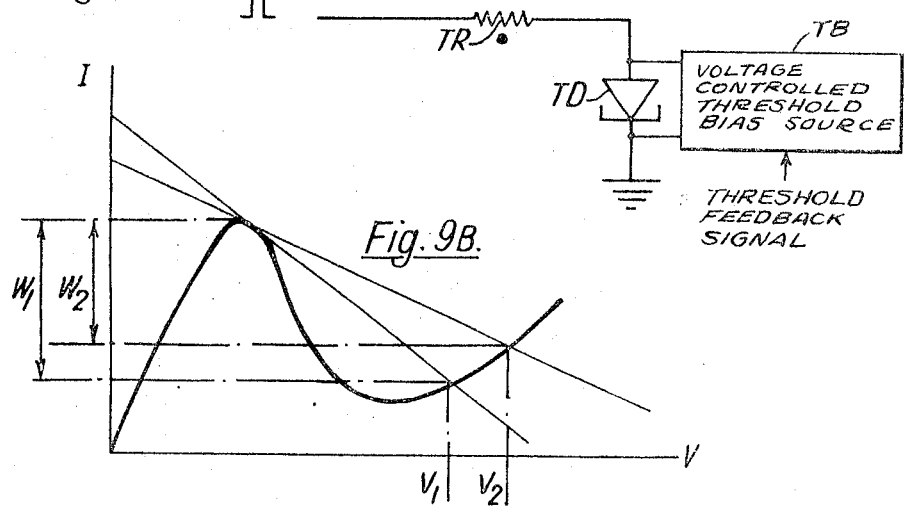

Reference to FIG. 9B shows that by altering the slope of the load line, which is what the change in thermistor resistance is equivalent to, not only is the current, and, hence, the weight changed, but also the switching voltage, which is in fact the threshold. To overcome this drawback, a second thermistor is incorporated as shown in FIG. 10. This compensating network with two thermistors TR1 and TR2 and D.C. bias from bias source B and register R reduces the change in threshold when the power in the heating coil HC is varied.

As in FIG. 9A, the threshold feedback voltage adjusts the threshold value of diode TD by means of voltage controlled threshold bias source TB which, in turn, adjusts the threshold bias provided by source B and resistor R.

It will be noted that if the difference signal samples are taken with reference to a level $\frac{1}{2}q$ that both positive and negative error information will be derived. One way of avoiding this is to bias the weight and thresholds deliberately high and then to regard all the error signals as being of one polarity only. This will also reduce the risk of a circuit hunting about a zero signal condition.

It will be appreciated that each coding element in FIG. 1 will require a complete set of logic similar to that shown in FIG. 4. However, since the speed of the logic is not required to be that of the bit rate, lower grade components can be used.

An alternative application of the invention is to high linearity coders where the digit weights have to be more accurately defined than is possible with available close tolerance components operating without stabilizing feedback.

It is to be understood that the foregoing description of specific examples of this invention is not to be considered as a limitation of its scope.

We claim:
1. A coder comprising:
 a plurality of coding elements;
 first means to couple an input signal directly to said coding elements;
 second means coupled to said first means to sample said input signal at the termination of each coding operation and to separately store each of said samples;

third means coupled to each of said coding elements and said second means responsive to said coding elements and said samples of said second means for generating a feedback signal for each of said samples related to the value thereof; and first means for coupling said feedback signals from said third means to said coding elements to stabilize at least one predetermined characteristic of said coding elements.

2. A coder according to claim 1, wherein said first means includes:

a source of analog signal, fifth means coupled to each of said coding elements to produce a sum signal proportional to the sum of the weighted output of each of said code elements at the termination of each coding operation, and sixth means coupled to said source and said fifth means to produce said input signal equal to the difference between the amplitude of said analog signal and the amplitude of said sum signal.

3. A coder according to claim 1, wherein said third means includes:

integrator means to provide said feedback signal with a value related to the integrated value of each of said samples.

4. A coder according to claim 1, wherein said second means includes:

a sample and hold circuit arrangement.

5. A coder according to claim 1, wherein said third means includes:

logic circuitry coupled to each of said coding elements, and coincident gate means coupled to said logic circuitry and said second means to generate said feedback signals.

6. A coder according to claim 5, wherein said third means further includes:

integrator means coupled to said gate means to generate said feedback signals having a value equal to the integrated value of each of said samples.

7. A coder according to claim 1, wherein said third means includes:

fifth means coupled to each of said code elements and said second means to generate a pair of feedback signals for each of said code elements, and sixth means coupled to said fifth means to couple each of said pair of feedback signals to the associated one of said code elements.

8. A coder according to claim 7, wherein said sixth means includes:

a first integrator means having a first time constant for one feedback signal of each of said pair of feedback signals and a second time constant different than said first time constant for the other feedback signal of each of said pair of feedback signals.

9. A coder according to claim 1, wherein said second means includes:

a means coupled to said first means to provide a given reference level for said sample of said input signal greater than zero.

10. A coder according to claim 1, wherein said first means includes:

a source of analog signal;

fifth means coupled to each of said coding elements to produce a sum signal proportional to the sum of the weighted output of each of said code elements at the termination of each coding operation, and sixth means coupled to said source and said fifth means to produce said input signal equal to the difference between the amplitude of said analog signal and the amplitude of said sum signal;

said second means includes:

a sample and hold circuit arrangement coupled to said sixth means; and said third means includes:

logic circuitry coupled to each of said coding elements, and coincident gate means coupled to said logic circuitry and said sample and hold circuit arrangement to generate said feedback signals.

References Cited

UNITED STATES PATENTS

| | | | |
|---|---|---|---|
| 2,784,396 | 3/1957 | Kaiser | 340—347 |
| 3,293,635 | 12/1966 | Jankovich | 340—347 |
| 3,384,889 | 5/1968 | Lucas | 340—347 |
| 3,419,819 | 12/1968 | Murakami | 340—347 |
| 3,438,024 | 4/1969 | Smith | 340—347 |

MAYNARD R. WILBUR, Primary Examiner

J. GLASSMAN, Assistant Examiner

UNITED STATES PATENT OFFICE
CERTIFICATE OF CORRECTION

Patent No. 3,553,678          Dated April 16, 1971

Inventor(s) Alec Harley Reeves and Paul Barton Harlow

It is certified that error appears in the above-identified patent and that said Letters Patent are hereby corrected as shown below:

Column 7, line 6, cancel "first" and insert --fourth--.

Signed and sealed this 6th day of July 1971.

(SEAL)
Attest:

EDWARD M. FLETCHER, JR.
Attesting Officer

WILLIAM E. SCHUYLER, JR
Commissioner of Patents